United States Patent
Berger et al.

(10) Patent No.: US 10,909,491 B2
(45) Date of Patent: *Feb. 2, 2021

(54) OPEN MARKET CONTENT DISTRIBUTION

(71) Applicants: SONY CORPORATION, Tokyo (JP); SONY PICTURES ENTERTAINMENT INC., Culver City, CA (US)

(72) Inventors: Richard Berger, Culver City, CA (US); Mitch Singer, Los Angeles, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,664

(22) Filed: Aug. 9, 2016

(65) Prior Publication Data

US 2016/0350682 A1 Dec. 1, 2016

Related U.S. Application Data

(63) Continuation of application No. 12/678,074, filed as application No. PCT/US2008/076303 on Sep. 12, 2008, now Pat. No. 9,412,125.

(Continued)

(51) Int. Cl.
*G06Q 30/00* (2012.01)
*G06Q 10/06* (2012.01)
*G06Q 30/06* (2012.01)

(52) U.S. Cl.
CPC ........... *G06Q 10/067* (2013.01); *G06Q 30/06* (2013.01); *G06Q 30/0601* (2013.01)

(58) Field of Classification Search
CPC ....................................................... G06F 21/00
(Continued)

(56) References Cited

U.S. PATENT DOCUMENTS 5,010,571 A 4/1991 Katznelson
5,247,575 A 9/1993 Sprague et al.
(Continued)

FOREIGN PATENT DOCUMENTS

EP 1376307 A2 * 1/2004 ............. H04L 63/06
EP 1376309 A2 * 1/2004 ............. G06F 21/10
(Continued)

OTHER PUBLICATIONS

Sai Ho Kwok. Digital Rights Management for the Online Music Business. (Aug. 15, 2002). Retrieved online Sep. 15, 2020. https://citeseerx.ist.psu.edu/viewdoc/download?doi=10.1.1.106.6956&rep=rep1&type=pdf (Year: 2002).*

(Continued)

*Primary Examiner* — James A Reagan
(74) *Attorney, Agent, or Firm* — Procopio, Cory, Hargreaves & Savitch LLP

(57) ABSTRACT

Content distribution for one or more user devices, including: associating the one or more user devices with a user domain; acquiring content with one or more user accounts linked to the user domain; accessing the acquired content with the one or more user devices according to predetermined privileges, wherein access for an individual user device of the one or more user devices is valid while the individual user device is associated with the user domain and has an active status with the user domain.

7 Claims, 10 Drawing Sheets

Related U.S. Application Data

(60) Provisional application No. 60/971,869, filed on Sep. 12, 2007, provisional application No. 60/985,074, filed on Nov. 2, 2007, provisional application No. 60/985,920, filed on Nov. 6, 2007.

(58) Field of Classification Search
USPC .......................................................... 705/59
See application file for complete search history.

(56) References Cited

U.S. PATENT DOCUMENTS

| | | | |
|---|---|---|---|
| 5,267,313 A | 11/1993 | Hirata et al. | |
| 5,319,705 A | 6/1994 | Halter et al. | |
| 5,349,642 A | 9/1994 | Kingdon | |
| 5,509,074 A | 4/1996 | Choudhury et al. | |
| 5,586,186 A | 12/1996 | Yuval et al. | |
| 5,719,938 A | 2/1998 | Haas et al. | |
| 5,737,416 A | 4/1998 | Cooper et al. | |
| 5,870,543 A | 2/1999 | Ronning | |
| 5,883,954 A | 3/1999 | Ronning et al. | |
| 5,883,955 A | 3/1999 | Ronning et al. | |
| 5,887,060 A | 3/1999 | Ronning et al. | |
| 5,892,900 A | 4/1999 | Ginter et al. | |
| 5,903,647 A | 5/1999 | Ronning et al. | |
| 5,907,617 A | 5/1999 | Ronning | |
| 6,385,596 B1 | 5/2002 | Wiser et al. | |
| 6,611,812 B2 | 8/2003 | Hurtado et al. | |
| 6,665,797 B1 | 12/2003 | Keung | |
| 6,799,165 B1 | 9/2004 | Boesjes | |
| 7,269,140 B2 * | 9/2007 | Matsumaru | H04L 12/12 |
| | | | 370/236 |
| 7,428,413 B2 | 9/2008 | Fink | |
| 7,627,903 B2 | 12/2009 | Kamperman et al. | |
| 7,668,157 B2 | 2/2010 | Weintraub et al. | |
| 7,725,399 B2 | 5/2010 | Nakahara et al. | |
| 7,805,526 B2 | 9/2010 | Takabayashi et al. | |
| 7,930,250 B2 * | 4/2011 | Lee | G06F 21/10 |
| | | | 705/50 |
| 8,051,473 B2 | 11/2011 | Szucs | |
| 8,108,313 B2 | 1/2012 | Raley et al. | |
| 8,181,266 B2 | 5/2012 | Oh et al. | |
| 8,510,847 B2 | 8/2013 | Knight | |
| 9,412,125 B2 * | 8/2016 | Berger | G06Q 30/06 |
| 2002/0010759 A1 | 1/2002 | Hitson et al. | |
| 2002/0063621 A1 | 5/2002 | Tseng et al. | |
| 2002/0073043 A1 | 6/2002 | Herman et al. | |
| 2002/0157002 A1 | 10/2002 | Messerges et al. | |
| 2003/0018491 A1 * | 1/2003 | Nakahara | G06F 21/10 |
| | | | 705/59 |
| 2003/0051149 A1 | 3/2003 | Robert | |
| 2003/0076955 A1 | 4/2003 | Alve et al. | |
| 2003/0220880 A1 | 11/2003 | Lao et al. | |
| 2004/0024670 A1 | 2/2004 | Valenzuela et al. | |
| 2004/0062400 A1 | 4/2004 | Sovio et al. | |
| 2004/0093523 A1 | 5/2004 | Matsuzaki et al. | |
| 2004/0133793 A1 | 7/2004 | Ginter et al. | |
| 2004/0162786 A1 | 8/2004 | Cross et al. | |
| 2004/0215735 A1 | 10/2004 | Nakahara et al. | |
| 2004/0220878 A1 | 11/2004 | Lao et al. | |
| 2005/0005141 A1 | 1/2005 | Nagai et al. | |
| 2005/0065891 A1 * | 3/2005 | Lee | G06F 21/10 |
| | | | 705/59 |
| 2005/0066353 A1 | 3/2005 | Fransdonk | |
| 2005/0091507 A1 | 4/2005 | Lee et al. | |
| 2005/0138406 A1 | 6/2005 | Cox | |
| 2005/0182727 A1 | 8/2005 | Robert et al. | |
| 2005/0182931 A1 | 8/2005 | Robert et al. | |
| 2005/0198510 A1 | 9/2005 | Robert et al. | |
| 2005/0216752 A1 | 9/2005 | Hofmeyr et al. | |
| 2006/0107046 A1 | 5/2006 | Raley | |
| 2006/0173787 A1 | 8/2006 | Weber et al. | |
| 2006/0173789 A1 | 8/2006 | Baumert et al. | |
| 2006/0184694 A1 * | 8/2006 | Monette | H04L 12/18 |
| | | | 709/246 |
| 2006/0259852 A1 | 11/2006 | Upendran et al. | |
| 2006/0259982 A1 | 11/2006 | Upendran | |
| 2006/0265427 A1 | 11/2006 | Cohen et al. | |
| 2007/0009230 A1 * | 1/2007 | Tanaka | G06F 21/10 |
| | | | 386/244 |
| 2007/0026935 A1 * | 2/2007 | Wolf | G07F 17/32 |
| | | | 463/25 |
| 2007/0055887 A1 | 3/2007 | Cross et al. | |
| 2007/0094042 A1 * | 4/2007 | Ramer | G06Q 30/0254 |
| | | | 705/1.1 |
| 2007/0100806 A1 * | 5/2007 | Ramer | G06F 16/9577 |
| 2007/0130260 A1 | 6/2007 | Weintraub et al. | |
| 2007/0159719 A1 | 7/2007 | Yamakawa et al. | |
| 2007/0162979 A1 | 7/2007 | Kamperman et al. | |
| 2007/0179854 A1 | 8/2007 | Ziv et al. | |
| 2007/0180485 A1 | 8/2007 | Dua | |
| 2007/0185814 A1 | 8/2007 | Boccon-Gibod et al. | |
| 2007/0192872 A1 * | 8/2007 | Rhoads | H04N 1/32144 |
| | | | 726/26 |
| 2007/0220575 A1 | 9/2007 | Cooper et al. | |
| 2008/0010209 A1 | 1/2008 | Lee et al. | |
| 2008/0015888 A1 | 1/2008 | Dang | |
| 2008/0147530 A1 | 6/2008 | Kwan | |
| 2008/0256592 A1 | 10/2008 | Schnell | |
| 2008/0256646 A1 | 10/2008 | Strom et al. | |
| 2008/0320599 A1 | 12/2008 | Raley et al. | |
| 2009/0063629 A1 | 3/2009 | Jeong et al. | |
| 2009/0274453 A1 | 11/2009 | Viswambharan | |
| 2009/0293131 A1 | 11/2009 | Pak et al. | |
| 2010/0017888 A1 | 1/2010 | Zhang et al. | |
| 2010/0024039 A1 | 1/2010 | Reuzel | |
| 2010/0031366 A1 | 2/2010 | Knight | |
| 2010/0293106 A1 * | 11/2010 | Rhoads | G06Q 30/02 |
| | | | 705/330 |

FOREIGN PATENT DOCUMENTS

| | | | | |
|---|---|---|---|---|
| EP | 1 505 530 A1 | 2/2005 | | |
| EP | 1515213 A1 * | 3/2005 | | G06F 21/10 |
| EP | 1564621 B1 | 9/2009 | | |
| JP | 2007183935 A | 7/2007 | | |
| KR | 1020040107602 A | 12/2004 | | |
| KR | 1020050028244 A | 3/2005 | | |
| KR | 1020050060685 A | 6/2005 | | |
| KR | 100708203 B1 | 4/2007 | | |
| WO | 2006107185 A1 | 10/2006 | | |

OTHER PUBLICATIONS

Office of The Privacy Commissioner of Canada. Digital Rights Management and Technical Protection Measures. (Nov. 2006). https://www.priv.gc.ca/en/privacy-topics/technology/mobile-and-digital-devices/digital-devices/02_05_d_32/ (Year: 2006).*

Microsoft Corporation. Microsoft Windows Rights Management Services (RMS) Security Target. (Jul. 9, 2007). Retrieved online Sep. 15, 2020. ttps://www.commoncriteriaportal.org/files/epfiles/st_vid10224-st.pdf (Year: 2007).*

Rosenblatt, Bill. "UltraViolet to Offer White Label Service." published Sep. 29, 2010 on Copyright and Technology: http://copyrightandtechnology.com/2010/09/29/ultraviolet-to-offer-white-label-service/ Retrieved Oct. 15, 2013 (2 pages).

Tribbey, Chris. "Six Questions: UltraViolet's Mitch Singer". published Sep. 3, 2010 on HM HomeMedia Magazine, Questex Media Group LLC: http://www.homemediamagazine.com/electronic-delivery/six-questions-ultraviolet%E2%80%99s-mitch-singer-20510 Retrieved Oct. 15, 2013 (2 pages).

Ulaby, Neda. "Introducing UltaViolet: Buy Your Digital Movie Once, Play it Anywhere?" published Jul. 20, 2010 on npr.com, NPR: http://www.npr.org/blogs/monkeysee/2010/07/19/128626624/introducing-ultraviolet-buy-your-movie-once-play-it-anywhere Retrieved Oct. 15, 2013 (2 pages).

Extended European Search Report issued in related European Application No. 08830940.6, dated Jul. 25, 2012, 8 pages.

Van Den Heuvel, et al. "Secure Content Management in Authorised Domains," Sep. 15, 2002, International Broadcasting Convention, XP002273504, 8 pages.

(56) References Cited

OTHER PUBLICATIONS

International Search Report and Written Opinion issued in PCT/US2008/076303 dated Mar. 31, 2009.
Gralla, "Digital River Launches DRM Solution for Software Publishers: New technology aimed at enchancing revenue as publishers turn increasingly to global markets," Information Week, Apr. 15, 2004, Internet website: http://www.informationweek.com/news/18901739 (4 pages).
Digital River, "Digital River Announces New Digital Rights Management Service: Initial solution provides software protection, control, and management for authors of try-before-you-buy software," Digital River, Jul. 14, 2003, Internet website: http://www.digitalriver.com/corporate/Press_release/pr_328.html (1 page).
Silicon Realms, "SoftwarePassport: Protect your windows or Mac application from piracy and expand your global footprint," The Silicon Realms Toolworks, copyright 2009-2012, Internet website: http://www.siliconrealms.com/ (2 pages).
Author—Apple Corporation—ITunes application copyright—Publication Source: apple.com [URL: www.apple.com/itunes]—(Copyright Publication Date: Jan. 9, 2001).
Author—Microsoft Corporation—Zune application copyright—Publication Source: zune.net [URL:www.zune.net]—(Copyright Publication Date: Nov. 14, 2006).

* cited by examiner

OPEN MARKET CONTENT DISTRIBUTION

CROSS-REFERENCE TO RELATED APPLICATIONS

The present application is a continuation application of co-pending U.S. patent application Ser. No. 12/678,074 (filed Aug. 6, 2010), which is a 371 application of PCT Application Serial No. PCT/US08/76303 (filed Sep. 12, 2008), which claimed the benefit of priority under 35 U.S.C. § 119(e) of U.S. Provisional Patent Application No. 60/971,869 (filed Sep. 12, 2007), U.S. Provisional Patent Application No. 60/985,074 (filed Nov. 2, 2007), and U.S. Provisional Patent Application No. 60/985,920, filed Nov. 6, 2007. The disclosures of the above-referenced patent applications are incorporated herein by reference.

BACKGROUND

Field of the Invention

The present invention relates generally to content distribution, and more particularly to content distribution utilizing an open market distribution model.

Background

Digital distribution systems and methods such as Electronic Sell-Through ("EST") allow a consumer to purchase digital content electronically. Examples of digitally distributed content include EST video and music files offered for sale on the Internet. The consumer purchases and downloads the content for viewing or listening on a suitable device, and may be allowed a certain number of copies of the content to be made.

Conventionally, online stores make digital content available in proprietary formats according to the requirements of a target user device. Further, online stores often implement various business models and usage models, such as procedures for payment, and for downloading, storing, replicating and accessing the content.

One particular problematic usage model imposes a maximum copy count allowed to a consumer after purchasing content. For example, the consumer may be limited to four copies of the content once. Two copies are used immediately for the consumer's computer and portable device. However, computer hard drive and portable device failures may eventually lead to a situation where the consumer is left with no usable copies.

Various such requirements imposed by online stores tend to lock consumers into a "silo" consisting of a single user device platform, a single media format, and a single content source (e.g., network service such as an online store). Consumers that purchase content from these silo services are unable to access their content on other devices they may own which are not supported by that proprietary silo. As a result, these kinds of restrictions tend to lower consumers' perceived value of the "ecosystem" encompassing all electronic content distribution systems, because all but one (or a small few) become impractical for the consumer to use.

SUMMARY

Implementations of the present invention provide for methods and systems for content distribution using an open market model, wherein multiple user devices, as members of a user domain, have substantially free access to content associated with the user domain.

In one implementation, a method of content distribution for one or more user devices is disclosed. The method includes: associating the one or more user devices with a user domain; acquiring content with one or more user accounts linked to the user domain; accessing the acquired content with the one or more user devices according to predetermined privileges, wherein access for an individual user device of the one or more user devices is valid while the individual user device is associated with the user domain and has an active status with the user domain.

In another implementation, a content distribution system for one or more user devices is disclosed. The system includes: an open market coordinator (OMC) and a plurality of domain service providers (DSPs) in communication with the OMC. The OMC is configured to manage a user domain, wherein the one or more user devices are members of the user domain and have access to content associated with the user domain, and wherein an individual user device has access according to predetermined privileges, the access being valid while the individual user device is a member of the user domain and has an active status with the user domain. The DSPs are configured to enforce the predetermined privileges applied to the one or more user devices. The OMC is configured to support the enforcement of the predetermined privileges among the DSPs.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Figure 1:
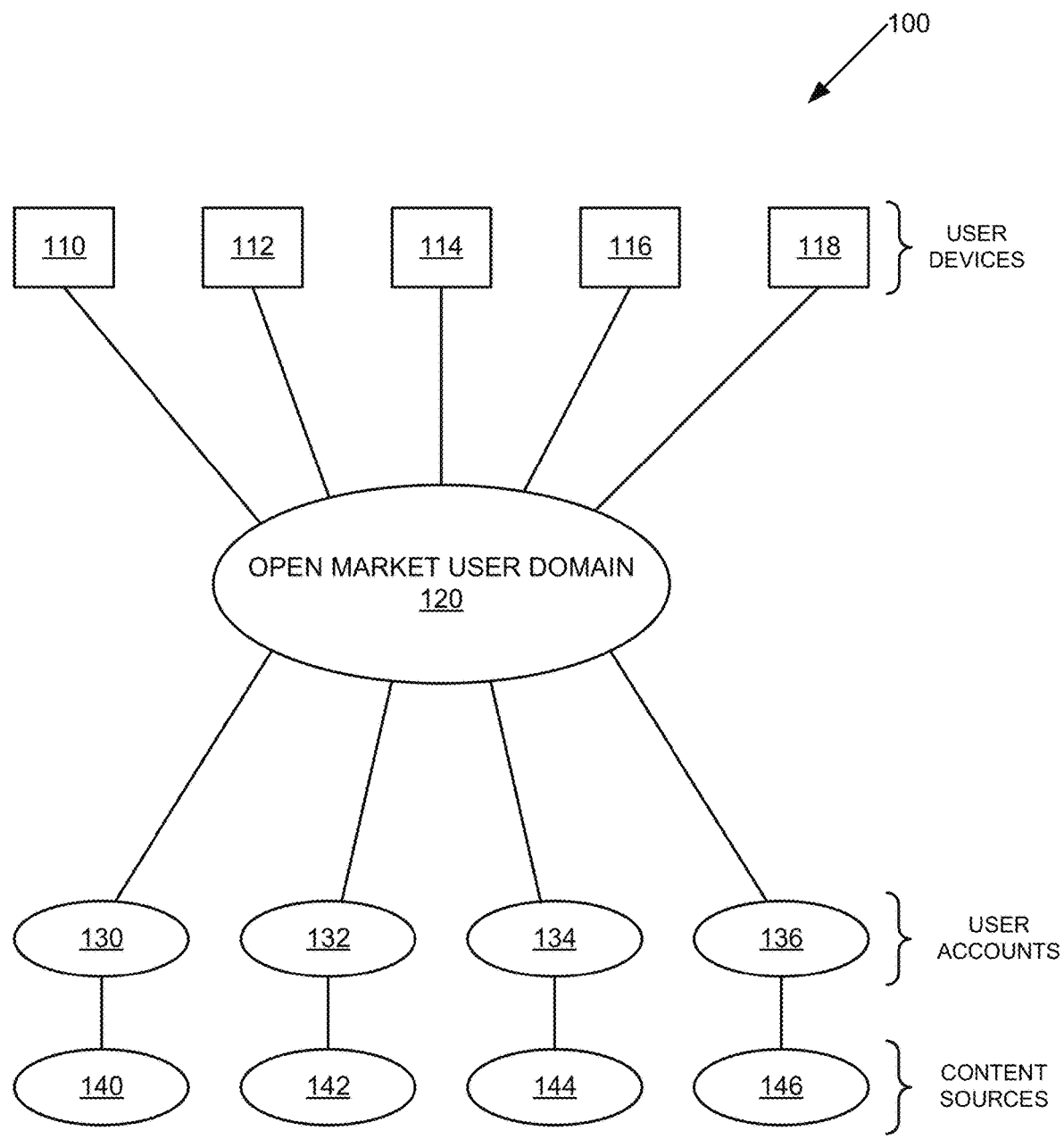
FIG. 1 illustrates an example implementation of an open market content distribution system.

Certain implementations as disclosed herein provide for content distribution in an "open market" system using a domain concept. A domain is sometimes referred to as a "user domain," "consumer domain," or "service-managed domain." In a user domain, a set of registered devices allows a consumer to freely access purchased content. The content is associated with the user domain and may only play on devices registered with the user domain. Implementations of the present invention also include provisions for Digital Millennium Copyright Act (DMCA) protection, associated obligations, redistribution prevention, controlled sharing, subscription support, rental support, content playing on domain devices, upgrade paths, back-ups, scalability, and for an electronic sell-through (EST) sales model.

In one implementation, an open market system enables transactions between a user domain and a plurality of vendors ("content sources," "storefronts," "stores"). The open market system operates according to defined standards by way of approved formats, and according to a single usage model providing the consumer with a uniform and consistent transaction experience at any entry point to the system. The consumer is allowed a choice of storefronts and user devices, thus enhancing the overall value of the distribution ecosystem. Scalability allows both new storefronts and consumers to freely participate in the open market model. Accordingly, new kinds of stores become possible as well.

In this implementation, an open market media usage model includes unrestricted access within a single domain of registered devices, one export of a content item to a discrete medium (e.g., a DVD back-up), and remote access outside of the domain using "strong" authentication. Rules may be imposed, for example, to limit a user domain to a predetermined member devices (e.g., 12), to limit membership for an individual user device to only one user domain at a time, to require expiration of a device's domain membership after a certain number of days of inactivity (e.g., 180 days but renewable), and to require association of a user account with a single user domain at any given time.

Various roles can be assigned to participants in the open market distribution model. For example, content providers license content to retailers; domain service providers manage digital rights management (DRM) domains and provide licenses and content fulfillment services; retailers provide storefront services to consumers and sell open market content; device makers manufacture compliant open market devices to play open market content; and an open market coordinator (OMC) may manage unique open market domain identities and facilitate interoperability between domain service providers (DSPs).

In one implementation, each domain service provider of a plurality of DSPs includes a plurality of open market interfaces, a rights locker, a plurality of DRM license servers each capable of administering at least one DRM type, and a plurality of DRM domain managers each capable of administering at least one DRM type. Associated with each DSP is at least one content source, typically implemented as an open market store.

The stores sell open market content to consumers. A domain service provider (DSP) associated with a store functions as a "back-end" for the store. The DRM license servers of a DSP generate DRM licenses which enforce rights sold by the stores associated with the DSP. The DRM domain managers enforce open market domain membership by creating and managing, for example, lower-level DRM objects such as domain keys. A rights locker of a DSP holds the rights to content acquired at stores associated with the DSP. Open market interfaces allow multiple, independent DSPs to enforce the open market domain model by interacting with a centralized OMC. The OMC manages unique open market domain IDs and supports the sharing of information necessary for interoperability among the DSPs.

In one example, a consumer receives a promotional offer via a cell phone to buy an open market version of a popular television show. The consumer selects the show and chooses to download it onto a user device at home. Later, at home, the consumer finds that the download is complete and watches the show.

In another example, a consumer receives a short message service (SMS) promotion to download a popular song. The consumer buys and downloads the song for listening on the cell phone, and later finds at home on the consumer's computer a promotion for the album and music video related to the song downloaded earlier.

In another example, a consumer is waiting to board a flight and wishes to download a movie onto a portable device from an airport media store kiosk. The consumer selects a movie and receives a choice between a one-time view on the portable device or the open market version. The open market version is selected and downloaded, and partially viewed during the flight. At home, the consumer may choose a home device to view the rest of the movie from where it was left off.

In another example, a consumer logs into the family's open market domain with a laptop while watching television. The consumer may view all recent purchases and/or transfer activity in an open market library for the family. Various views are provided, such as a list view or a cover view. The consumer transfers one or more movies onto one or more devices in the domain. Subsequent content offerings from the content provider fielded on the consumer's HDTV may be purchased and automatically added to the library.

In another example, a consumer shops for a media player at a store. The consumer is given an option of purchasing a device with open market movies preloaded. The consumer selects the movies using an open market system entry point at the store and purchases the device.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

As shown in FIG. 1, an example implementation of an open market distribution system 100 includes a plurality of user devices 110, 112, 114, 116, 118 linked to an open market user domain 120. The user devices 110, 112, 114, 116, 118 may link only to one user domain 120 at a time. Also shown are a plurality of content sources 140, 142, 144, 146 from which a consumer may acquire content to be managed by the user domain 120. For example, content sources 140, 142, 144, 146 may be different online stores making available various types of digital content in a variety of formats and/or according to a variety of usage models. Each content source 140, 142, 144, 146 is associated with the user domain 120 by way of a user account 130, 132, 134, 136.

All of the user accounts 130, 132, 134, 136 may be associated with the same consumer or consumers within a "household", and each separate user account 130, 132, 134, 136 associates the consumer with each content source 140, 142, 144, 146. Also, each user account 130, 132, 134, 136 may be associated with only one user domain 120 at a time.

Content that comes into the user domain 120 from the content sources 140, 142, 144, 146, therefore enters through one of the user accounts 130, 132, 134, 136. Thus, the content may enter the user domain 120 only through user accounts 130, 132, 134, 136 associated with the user domain 120, and only the user devices 110, 112, 114, 116, 118 associated with the user domain 120 may access the content.

In one implementation, the content is bound to the particular user account 130, 132, 134, 136 with which the content was acquired. For example, a content item (not shown) acquired from content source 140 will be bound to user account 130, and cannot be transferred to a different user account. However, the association of the user account 130 with the user domain 120 may be severed and re-established with another user domain (not shown). In this way, content may be transferred from one user domain to another at the user account level. In another implementation, by contrast, a content item may be transferred to another user domain by transferring it to a user account linked to that user domain, thus refining the granularity of separation from account level to content item level.

Content is linked to the user domain 120, and stored on a user device 110, 112, 114, 116, 118 associated with the user domain 120. Rights associated with the content are stored in the associated user account 130, 132, 134, 136. The rights determine access privileges that are applied to a user device 110, 112, 114, 116, 118 with respect to the content.

For example, a content item is acquired by a consumer with user device 112 from content source 142 through the consumer's user account 132. Rights associated with the content item are also acquired from the content source 142, and are stored in the user account 132. The rights define access privileges such as, for example, a limit to the number of hard copies of the content item that the consumer may make with the user devices 110, 112, 114, 116, 118 associated with the user domain 120. A license is derived from the stored rights, and is used to enforce the access privileges. The license is therefore uniquely associated with the content item, the rights in the user account 142, and the user device 112. In another implementation, a single license is associated not only with the user device 112, but any of the other user devices 110, 114, 116, 118 as well.

Figure 2:
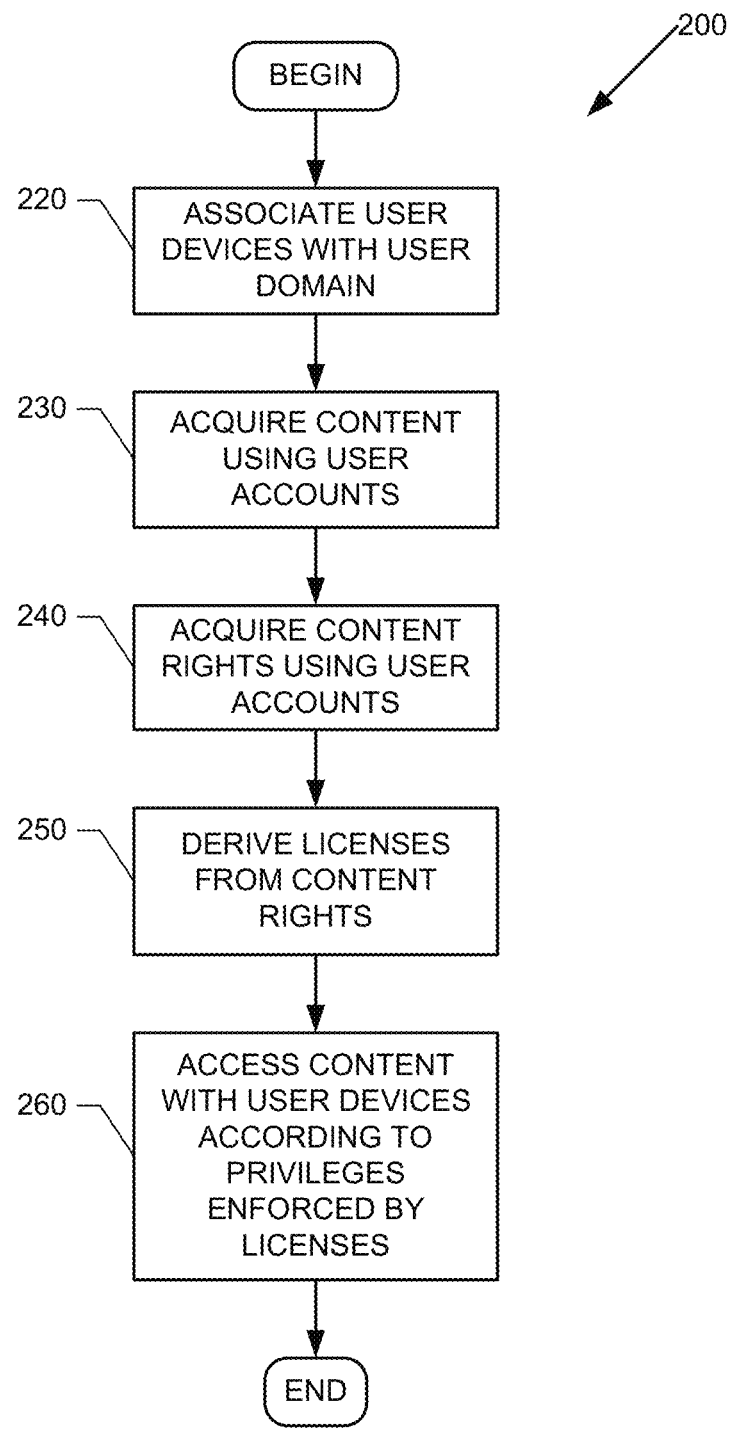
FIG. 2 is a flowchart illustrating an example implementation of a method of content distribution.

FIG. 2 is a flowchart illustrating an example implementation of a method of content distribution 200. One or more user devices are associated with the user domain, at block 220. Although a plurality of user devices may be associated with the user domain, acquiring content engages only one user device at a time. The consumer initiates an acquisition of content by making a first contact using a user device. In one implementation, associating the user device with the user domain, at block 220, includes an authentication on the first contact to (a) ensure that the consumer using the user device has an existing user domain, and (b) to locate the user domain. If a user domain does not exist, a new one is created for the consumer. A unique open market ID may be used, for example, to link the consumer's identity with the new user domain.

In another implementation, associating the user device with the user domain, at block 220, further includes registering the user device on a list of "member" user devices maintained by the user domain. Every registered user device may be a member of only a single user domain at a time. Thus, if the consumer sells a user device that is a member of one user domain, it must be de-registered from that user domain and re-registered for membership with the user domain associated with the new owner.

Content is acquired through a user account, at block 230. As discussed above, content is acquired from a content source such as an online store. Rights related to the content are also acquired, at block 240. As discussed above, the rights predetermine access privileges applied to the user devices with respect to the content. The rights thus acquired are stored in the user account.

A license is derived from the acquired rights, at block 250. As discussed above, the license is used to enforce the privileges (defined by the rights) on a user device bound with the license. In one implementation, the license enforces a DRM scheme. Access by the user device (or devices) to the content according to the predefined privileges (enforced by the license) is then provided, at block 260.

Acquired content is stored on the user device, and may therefore be accessed at any time. The user device has free access subject only to the access privileges enforced by a corresponding license. Much of the time, however, the user device may not be in contact with the open market content distribution system, and thus not in contact with the user domain of which it is a member. This is especially true for portable user devices, which may only make contact when docked at home or otherwise connected to a network, depending on capabilities of a device. In one implementation, the user device loses its membership with the user domain when it loses contact with the user domain for a period of time longer than a predetermined time-out limit. Thus, access to the content by the user device continues while the period that the user device has been out of contact with the user domain does not exceed the predetermined time-out limit. For example, in one implementation, when the user device has not had contact with the user domain for a time-out period of 180 days, an internal status is changed from "active" to "inactive," and the user device deems its access privileges to the content (which is stored on the user device) as invalid. If, on the other hand, the user device makes contact with the user domain before the predetermined time-out period has elapsed, its status is internally refreshed as "active," and the time-out period is reset.

Figure 3:
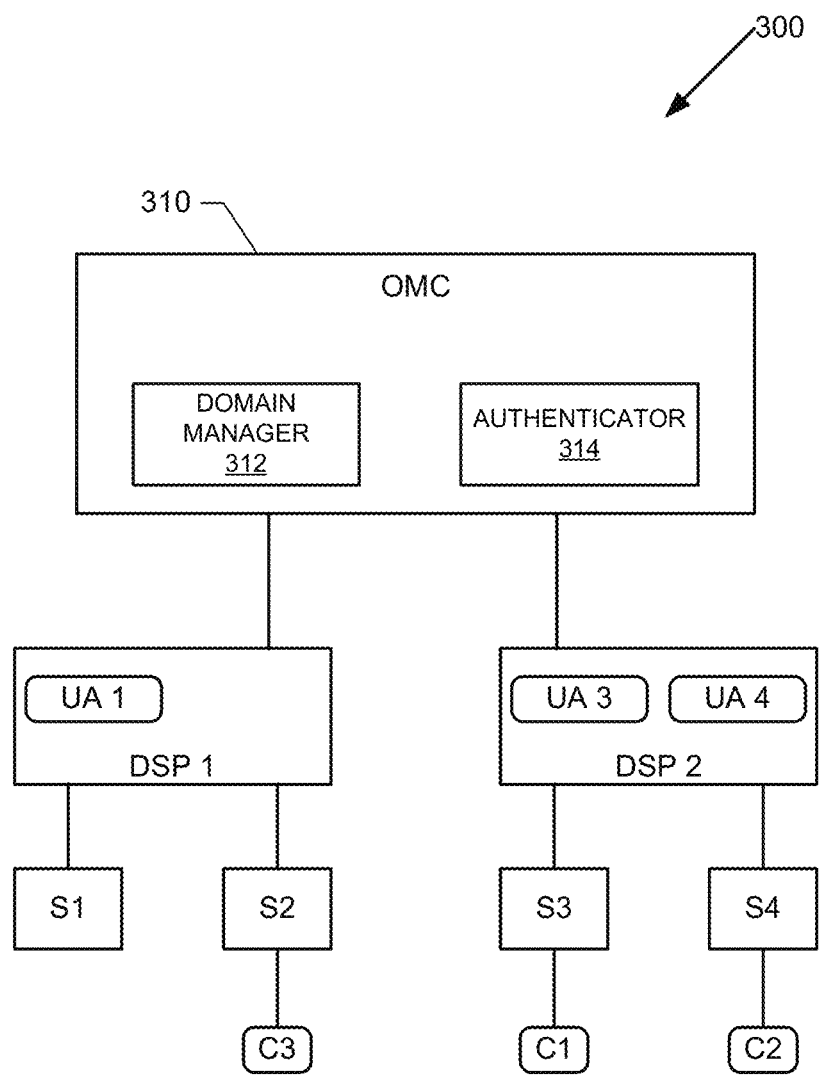
FIG. 3 is a functional block diagram depicting an example implementation of an open market content distribution system.

FIG. 3 is a functional block diagram depicting an example implementation of an open market content distribution system 300 including an open market coordinator (OMC) 310 and a plurality of domain service providers (DSPs) DSP1, DSP2.

The OMC 310 includes a user domain manager 312 configured to manage a plurality of user domains, where a user domain is associated with each consumer transacting with the system 300. The OMC 310 may also include an authenticator 314 configured to determine that a consumer is registered with a user domain.

A plurality of DSPs (e.g., DSP1 and DSP2) includes one or more user accounts UA1 UA3, UA4. Each DSP is in communication with at least one content source S1, S2, S3, S4. As discussed above, content sources S1, S2, S3, S4 are typically stores from which a consumer may acquire desired content such as video and music items. Each user account UA1, UA3, UA4 is uniquely associated with a consumer and one of the content sources S1, S2, S3, S4, and is listed in the user's domain at the OMC 310. In one implementation, the user accounts are part of a "rights locker" (not shown).

A plurality of user devices C1, C2, and C3 typically comprise devices for playing and/or viewing content, and include both portable and fixed devices. A user device C3, C1, or C2 is used to acquire new content from a content source S1, S2, S3, or S4. This includes acquiring the rights to the content stored in the appropriate user account UA1, UA3, UA4. The DSPs (e.g., DSP1, DSP2) are configured to enforce predetermined privileges defined by the stored rights and applied to the plurality of user devices C3, C1, and C2. In one implementation, the predetermined privileges include limitations as to playing and/or copying the acquired content.

As shown, the user devices C3, C1, and C2 are connected to content sources S2, S3, and S4, respectively. These connections occur when a user device C3, C1, or C2 is transacting with the content distribution system 300.

Acquiring desired content results in the content being stored on the user device C3, C1, or C2. It is accessed, for example, for listening, viewing, or copying. When the user device C3, C1, or C2 is not connected with the system 300, a time-out period runs until either (a) the user device C3, C1, or C2 re-establishes contact with the system 300 (e.g., through S1, S2, S3, or S4 to a DSP), whereupon the time-out is reset, or (b) a maximum time limit is reached, whereupon the content becomes inaccessible by the user device C3, C1, or C2. In one implementation (also described above in relation to FIG. 2), a status of the user device C3, C1, or C2 is active while the maximum time-out period has not been reached, and inactive otherwise. Re-establishing contact with the system 300 serves to refresh the user device to an active status and to reset the time-out period. However, if the maximum time-out period is reached, the user device C3, C1, or C2 must subsequently be re-associated with the user domain managed at the OMC 310.

As described, the OMC 310 includes a domain manager 312. The domain manager 312 facilitates a functionality of the OMC 310 for sharing information among DSPs (e.g., DSP1, DSP2) to coordinate access to content for the user devices C3, C1, and C2. Use cases illustrated in FIG. 4 through FIG. 9B, discussed below, elaborate on this coordination functionality and are instructive as to the operation of the content distribution system 300.

It will be appreciated that although only two DSPs (DSP1, DSP2) are shown, the plurality of DSPs may include many more. Similarly, the number of user accounts manageable at a DSP is not limited to the two user accounts (e.g., UA3 and UA4 of DSP2). Further, many more content sources than the four (S1, S2, S3, S4) illustrated in FIG. 3 may be handled by a DSP. The number of user devices C3, C1, and C2 allowed to associate with a single user domain is typically limited by policy to a predetermined maximum. In one implementation, for example, the maximum allowable is 12.

Figure 4:
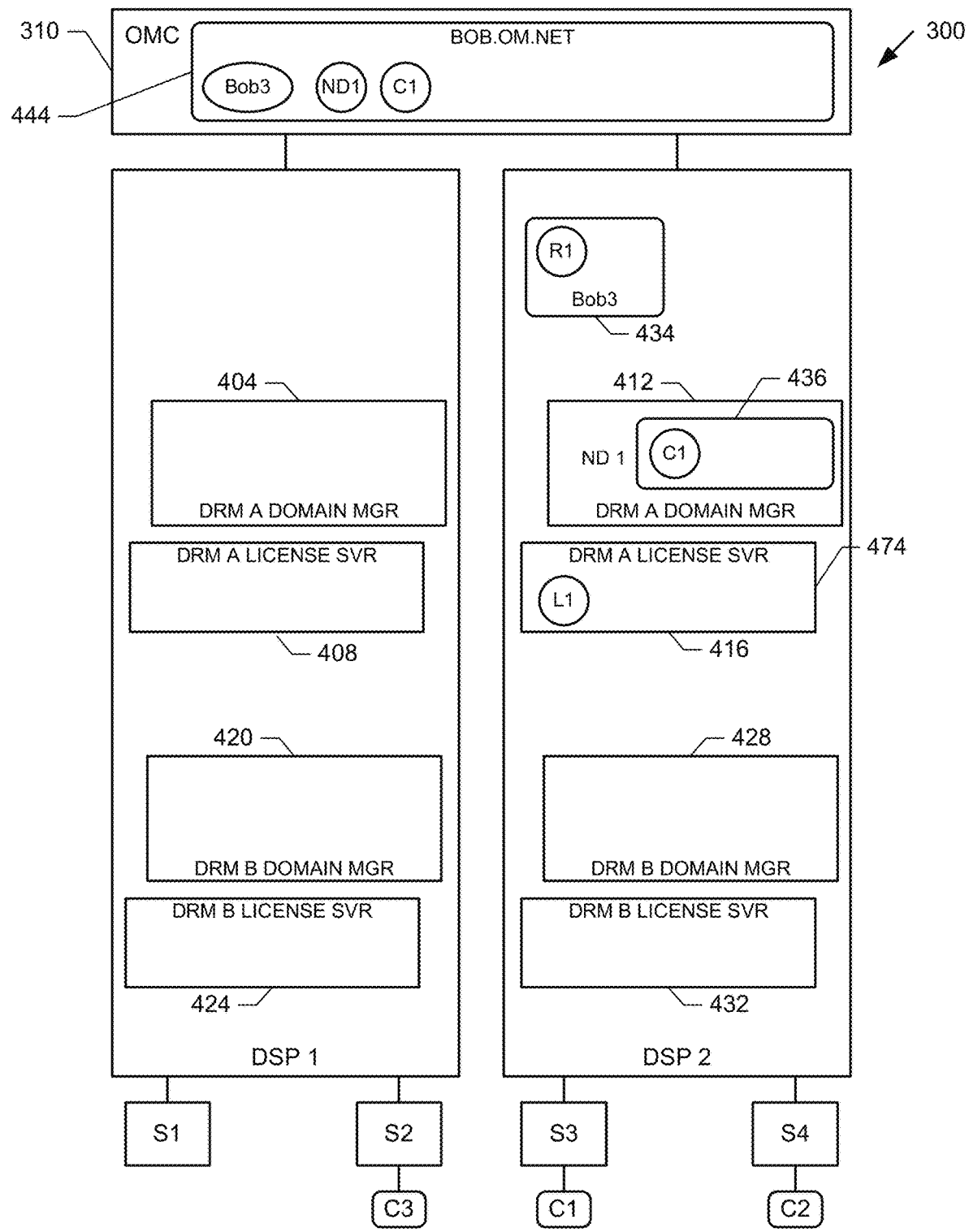
FIG. 4 is a functional block diagram depicting an example use case of a new user device at first contact with the content distribution system.

FIG. 4 is a functional block diagram depicting an example use case of a new user device at first contact with the content distribution system 300. As shown, a plurality of DSPs (DSP1, DSP2) is in communication with the OMC 310. In one implementation, communications between the OMC 310 and the DSPs are facilitated by open market interfaces (not shown). The OMC 310 is configured to manage a plurality of user domains, although only the user domain 444 is depicted for purposes of discussion. As shown, the user domain 444 incorporates an example URL, BOB.OM.NET, in compliance with an implementation of an open market interface.

The DSP (DSP1, DSP2) includes DRM domain managers 404, 412, 420, 428 specialized to implement DRM types A and B models, and DRM license servers 408, 416, 424, and 432 for enforcing DRM types A and B privileges. It will be appreciated that only two DRM models are represented (i.e., DRMs A and B) for explanatory purposes, but that many other types of rights management models are also possible.

In this example, DSP1 interacts with content sources S1 and S2, and DSP2 transacts with content sources S3 and S4, a consumer uses a user device C1 to transact with S3, C2 to transact with S4, and C3 to transact with S2. In this example, and the examples that follow, the content sources S1, S2, S3, and S4 represent stores (online or offline).

The consumer begins a transaction by selecting open market content from S3 using C1. The consumer is prompted create a user account 434 for S3, managed by DSP2. In this example, the user account 434 is assigned the name "Bob3."

It is indicated that the consumer does not have an open market user domain, so an open market domain 444 is created accordingly for the consumer at the OMC 310. The consumer is allowed a single user domain 444, and a unique open market ID is assigned to link the consumer and the user domain 444.

As discussed above, an open market interface may facilitate communications between the DSPs (DSP1, DSP2). An example implementation is demonstrated as shown with the assignment of a unique universal resource locator (URL) "BOB.OM.NET" to the user domain 444. It will be appreciated that an open market interface may be implemented in other ways as well.

The user account 434 created at DSP2 is automatically associated with the consumer's open market user domain 444 on the OMC 310. The association is represented by the oval containing "Bob3" shown inside the user domain 444. In one implementation, the user domain 444 maintains a list onto which the identifier "Bob3" is entered. Thus, a logical link is created between the user domain 444 and the user account 434 on DSP2.

The consumer uses C1 to complete the purchase of content from S3. Rights R1 representing the content purchase are stored in the user account 434 on behalf of S3. In an implementation, the user account 434 is part of a rights locker (not shown) of DSP2, configured to manage the user accounts for all consumers transacting through DSP2.

To acquire the content, C1 must be registered with the open market user domain 444. DSP2 first determines if there is an open slot in the user domain 444 to accommodate that device. In one implementation, a policy is enforced which limits the number user devices C1, C2, C3 which may be registered. If there is an open slot, the OMC 310 provides an authorization to DSP2 to add the device to the user domain 444. The registration of C1 with the user domain 444 is represented by the circle containing "C1" shown inside.

DSP2 also creates a "native domain" ND1 (436) managed by a DRM A domain manager 412. Any of the plurality of user devices C1, C2, C3 which acquire content through S3 or S4 that is subject to access privileges imposed by DRM A will be listed together in ND1. The OMC 310 is notified when C1 joins the native domain ND1 (436) and enters ND1, represented by the circle containing "ND1" in the user domain 444.

The rights R1 defining access privileges for the content are used internally at DSP2 to derive a domain-based DRM license L1 for C1. The license L1 is represented by the circle containing "L1" shown inside the DRM A license server 474. The license L1 and the content are delivered to C1, where the content may be accessed according to access privileges enforced by L1.

Figure 5:
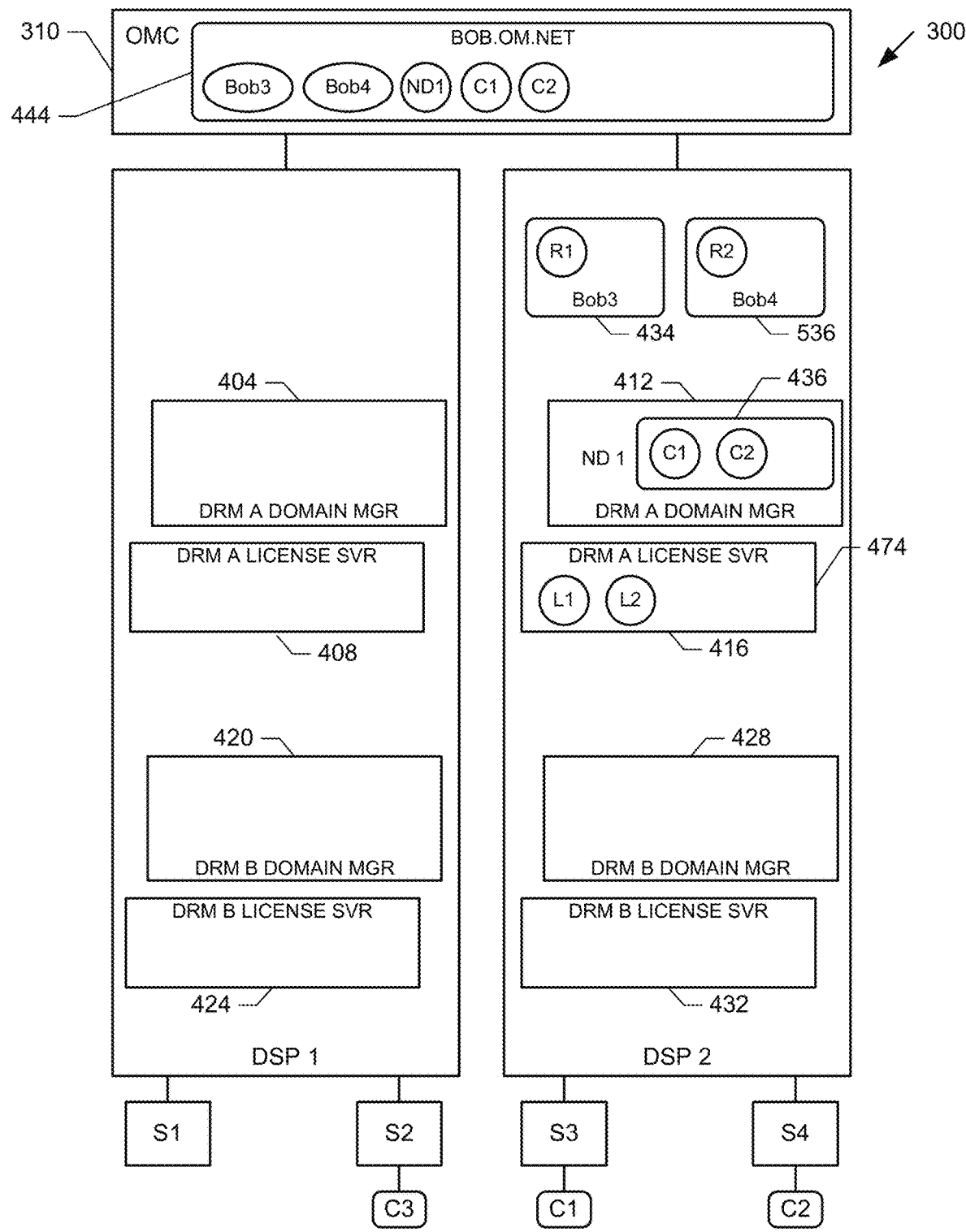
FIG. 5 is a functional block diagram depicting an example use case of a new user device acquiring content at a new store.

FIG. 5 is a functional block diagram depicting an example use case of a new user device acquiring content at a new store. In this example, the consumer begins a transaction by selecting open market content from S4. As indicated in FIG. 5, the consumer uses the user device C2 for access to S4. The consumer chooses to use the consumer's open market ID to log in. Authentication is performed and a new user account 536 at DSP2 is associated with the consumer's open market ID, and is represented by the oval containing "Bob4" in the user domain 444. Here, "Bob4" indicates the consumer's identity, and that the user account 536 is bound to S4. Rights R2 corresponding to the content selected at S4 are stored in the user account 536, represented by the circle containing "R2."

DSP2 verifies that the device member count of the consumer's user domain 444 will accommodate another user device C2, and connects C2, if necessary, to native domain ND1 (436). This is represented by the circle containing "C2" inside the block representing ND1 (436). DSP2 then notifies the OMC 310 of the connection of C2 to ND1 (436), which the OMC 310 enters in the user domain 444, represented by the circle containing "C2." A license L2 based on DRM A is derived from rights R2, represented by the circle containing "L2" inside the DRM A license server 474, and delivered to C2 with the content.

Figure 6:
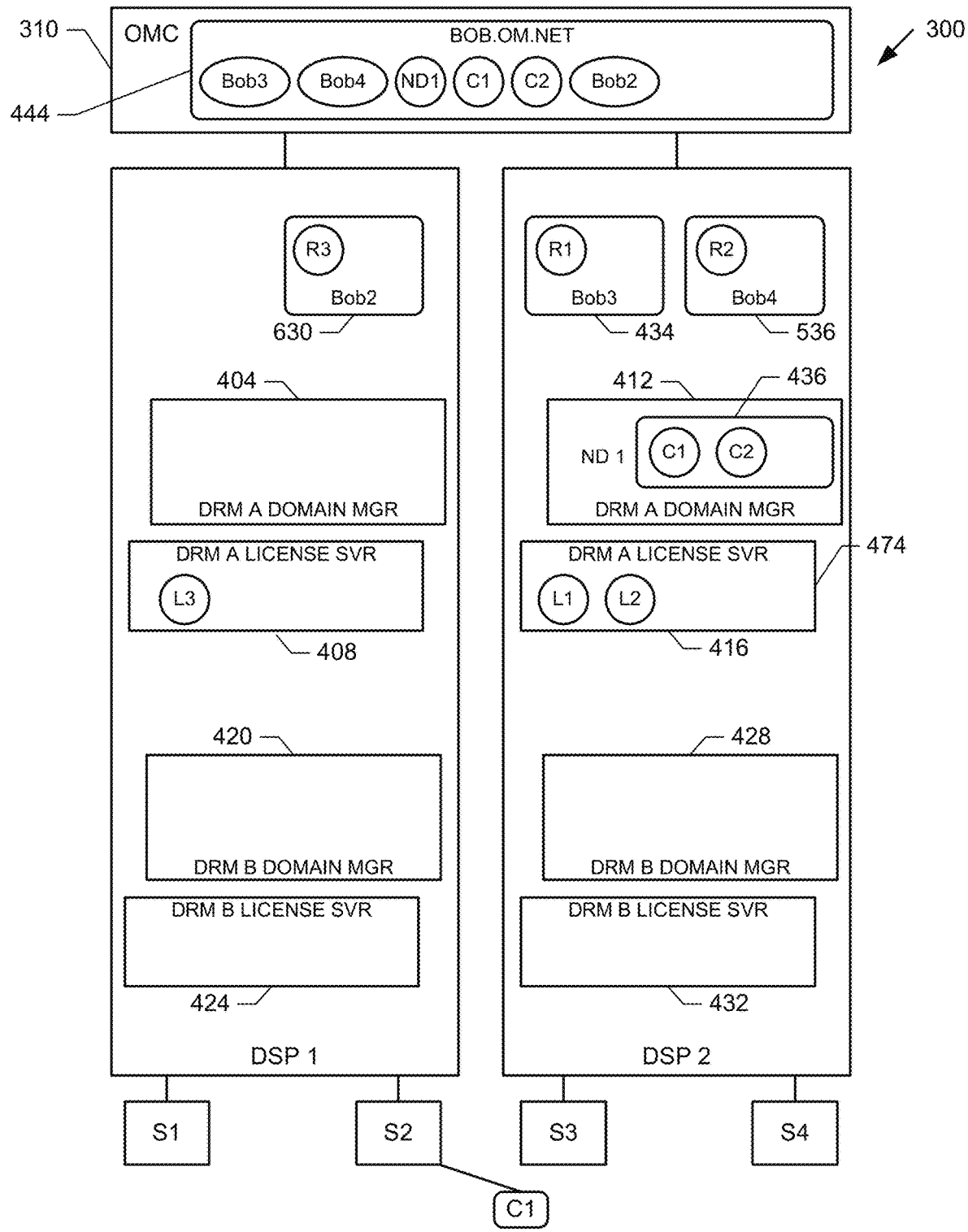
FIG. 6 is a functional block diagram depicting an example use case of an existing user device acquiring content at a new store.

FIG. 6 is a functional block diagram depicting an example use case of an existing user device acquiring content at a new store. In this example, the consumer uses C1 to select open market content at S2, which is back-ended by DSP1. The consumer authenticates with the user domain 444 using the consumer's open market ID, and a new user account 630 for that ID is created at DSP1. The new user account 630 is identified as "Bob2" to indicate the consumer's identity, and that the user account 630 is bound to S2. Rights R3 are stored with user account 630. DSP1 queries the OMC 310 for the existence of a native binding for C1. The OMC 310 delivers a confirmation according to the list maintained in the user domain 444 of the binding of C1 with native domain ND1 (436) on DSP2. A DRM license L3 is derived from rights R3 at the DRM A license server 408 of DSP1 and delivered to C1.

Thus, the OMC 310 has facilitated interoperability between DSP1 and DSP2. As a result of sharing information stored in the user domain 444 between DSP1 and DSP2, the user device C1, which is bound to ND1 (436) on DSP2, receives license L3 generated by DSP2 to enforce access privileges related to content acquired from S2, which is back-ended by DSP2.

Figure 7:
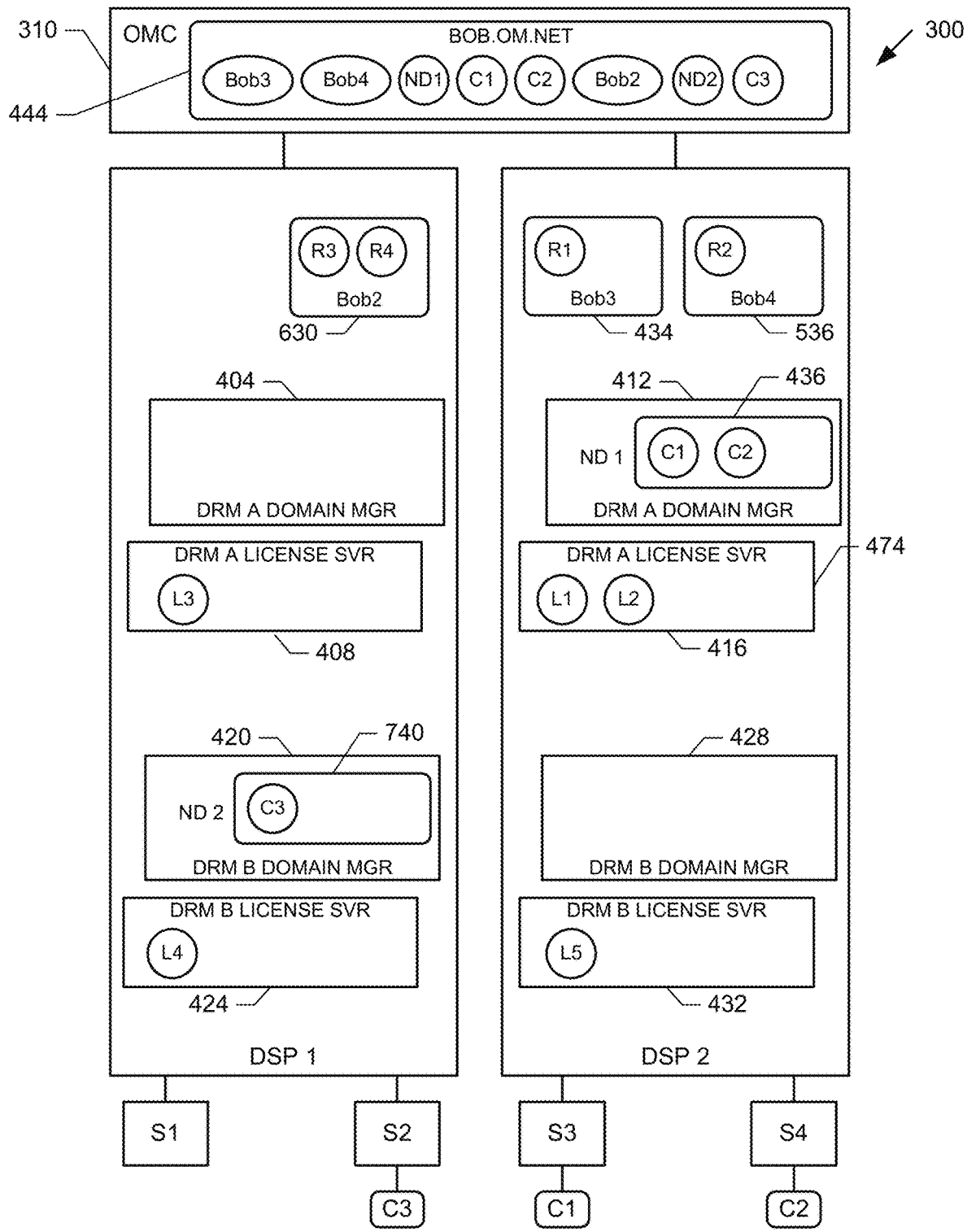
FIG. 7 is a functional block diagram depicting an example use case of a new user device acquiring content using different digital rights management.

FIG. 7 is a functional block diagram depicting an example use case of a new user device acquiring content using different digital rights management. In this example, the consumer uses a new device C3 to shop at S2, which is back-ended by DSP1. The consumer authenticates with the user domain 444 using the consumer's open market ID. Because the consumer has already transacted a purchase at S2, as discussed in relation to FIG. 6, a user account 630 already exists at DSP2 binding the consumer to S4. As shown, rights R4 for the content purchased using C3 at S2 are stored in the user account 630 along with the rights R3 purchased previously. DSP1 queries the OMC 310 for an open device slot in the consumer's user domain 444. A new native domain ND2 (740) on DSP2 is created to accommodate the new user device C3, which has not transacted before with the system 300. C3 joins the native domain ND2 (740), as shown, and the OMC 310 is notified, resulting in entries in the user domain 444 representing ND2 and C3. A new license L4 derived from rights R4 and based on DRM B is created at the DRM B license server 424 of DSP1 and delivered to C3 with the purchased content. Thus, the OMC 310 coordinates the creation of a new native domain ND2 (740) on DSP1 for C3, while the consumer's other user devices C1 and C2 are natively bound to DSP2 with ND1 (436).

Figure 8:
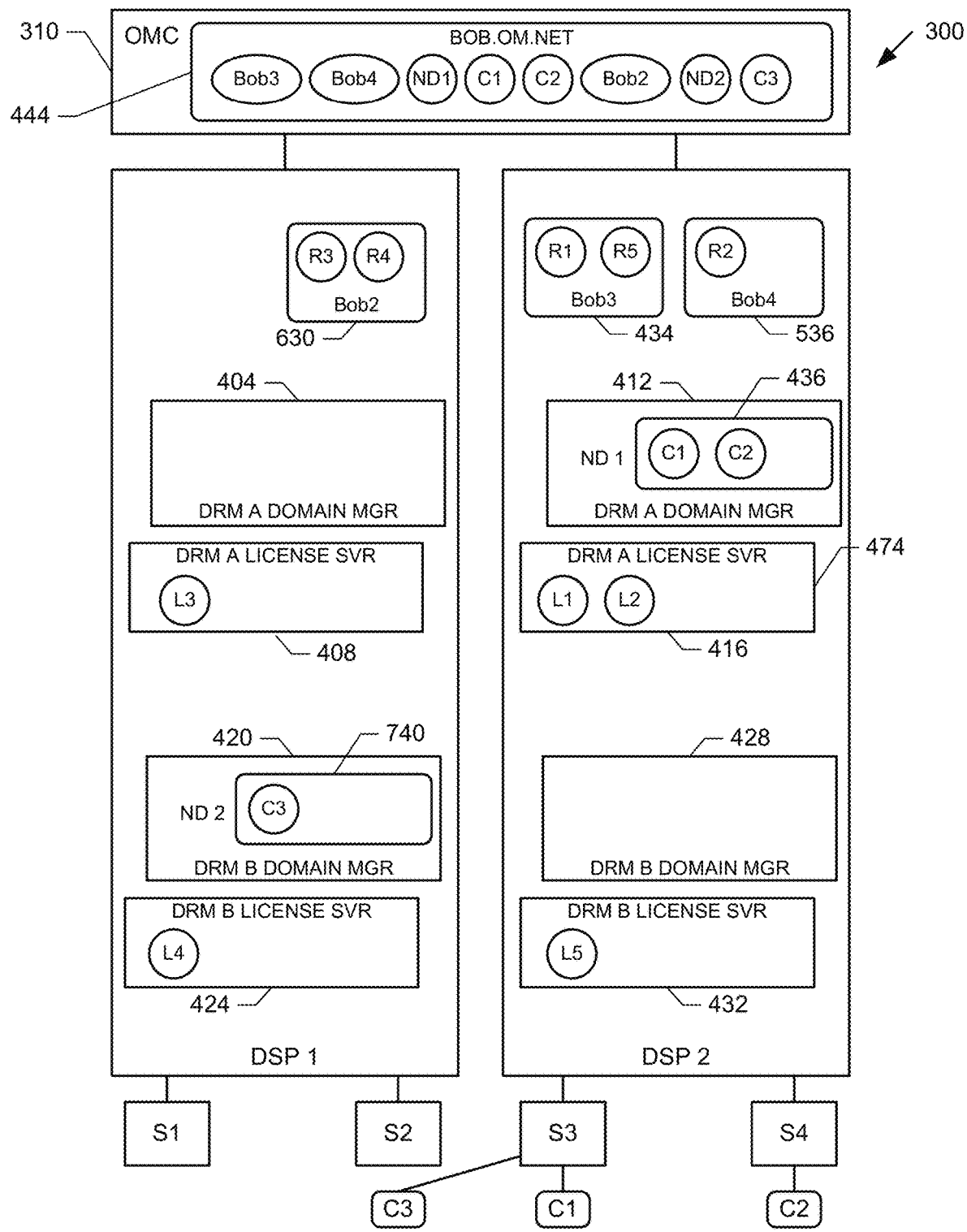
FIG. 8 is a functional block diagram depicting an example use case of a repeat consumer acquiring content using a different user device.

FIG. 8 is a functional block diagram depicting an example use case of the repeat consumer acquiring content using a different user device. In this example, the consumer uses C3 to shop at S3, back-ended by DSP2. (By contrast, in the previous example shown in FIG. 7, the consumer used C3 to purchase content at S2, back-ended by DSP1.) The consumer authenticates at the OMC 310 with an open market ID and the transaction proceeds. Rights R5 for the content purchased by C3 at S3 are stored in the user account 434 on DSP2, binding the consumer to S3 with respect to this content. DSP2 queries the OMC 310 for the native domain of C3, which is ND2 (740) on DSP1. Native domain ND2 operates under DRM B. As a result, a new DRM license L4 derived from rights R5, based on DRM B, and bound to C3 is created at the DRM B license server 432 of DSP2 and delivered to C3 along with the purchased content. Thus, the OMC 310 has coordinated a purchase of content through S3 and DSP2 for a user device C3 natively bound to DSP1.

In another implementation, a consumer's rights at multiple DSPs may be aggregated at the user device. Referring still to FIG. 8, the consumer using C1 wishes to determine all of the purchased rights associated with the open market user domain 444. However, since the consumer is entering the content distribution system 300 through S3 and DSP2, only the rights R1 and R5 stored in user account 434, associated with the consumer and S3, available without support of the OMC 310 to determine rights residing elsewhere. Accordingly, upon a request by the consumer for rights within the entire system 300, DSP2 requests from the OMC 310 the locations of all user accounts associated with the user domain 444. In response, for example, the OMC 310 returns to C1 a list of user accounts 630, 434, 536 (i.e., Bob2, Bob3, and Bob4). With the list, C1 may invoke interfaces (not shown) directly with the user accounts 630, 434, 536 on the appropriate DSPs. Tokens representing the rights are returned to C1, where they are aggregated. Thus, for example, a consumer may view all recent purchase and/or transfer activity in an open market "library" for the family. Various views of the library may be provided, such as a list view or a cover view. The consumer may transfer one or more movies onto one or more user devices in the user domain.

In other implementations, instead of aggregating the rights at C1, the rights may, for example, be published via "really simple syndication" (RSS), aggregated online at the OMC or at a user-designated repository, or rebroadcast within the local area network (LAN) via universal plug and play (UPnP).

A consumer may wish to change the membership of a user device from a first user domain to a second user domain. In one implementation, referring to FIG. 9A and FIG. 9B, for example, the consumer ("Bob") wishes to transfer ownership of the user device C1 to another consumer ("Jane"). Jane will wish to register C1 as a member of the user domain 948.

Figure 9A:
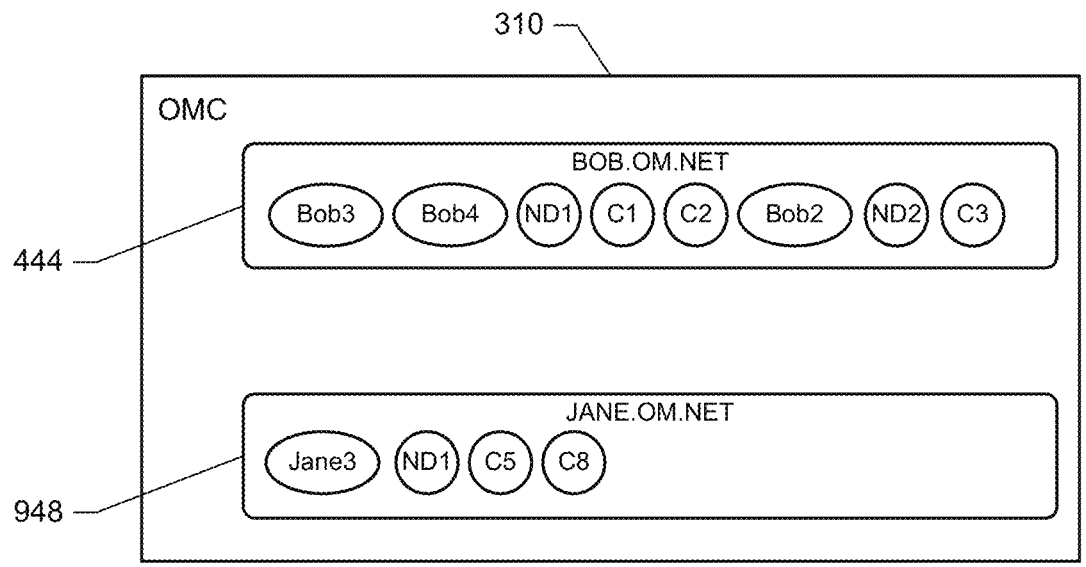
FIG. 9A and FIG. 9B illustrate the effect of transferring a user device to a different user domain.
Figure 9B:
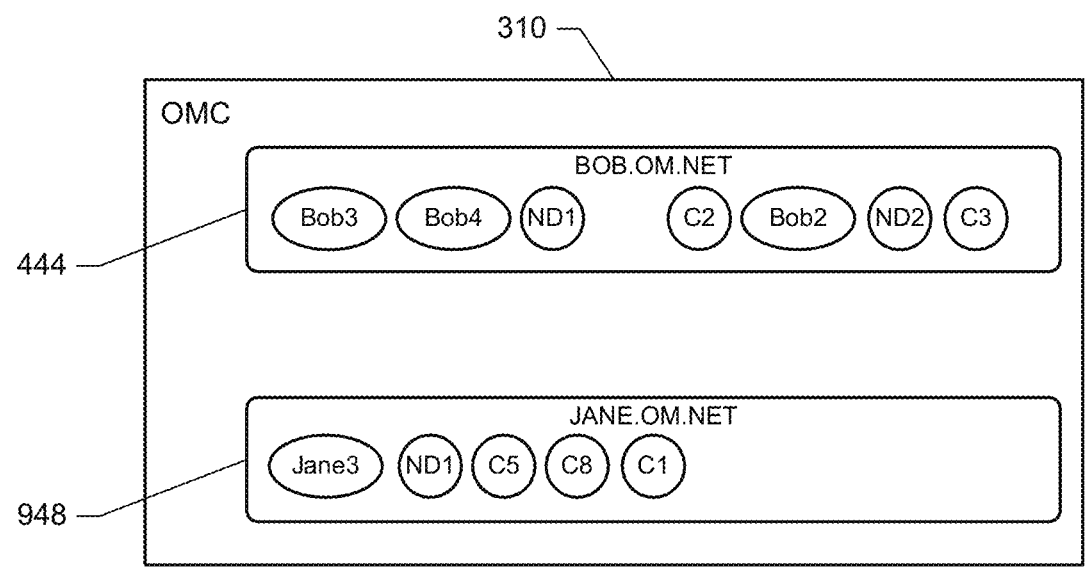

FIG. 9A illustrates the membership of C1 in the user domain 444. A communication is made to the OMC 310 requesting removal of C1 from the user domain 444. In addition to removing C1 from the list maintained in the user domain 444, C1 is also removed from ND1 (436) of DSP2 (referring, for example, to FIG. 8). Once C1 is removed from the user domain 444 and ND1 (436), Jane may proceed similarly as described in relation to FIG. 4 to add C1 to the user domain 948.

In one implementation, C1 may gain membership in the user domain 948 through S3 and DSP2, in the same way it gained membership in the user domain 444. Joining C1 to the user domain 948 also results in joining C1 with a native domain bound to Jane and S3 on the DSP2. Alternatively, C1 may be used after transfer to Jane to access content already acquired by Bob through the various stores S2, S3, S4, as discussed above. While not in contact with the content distribution system 300, the predefined time-out period begins to toll. When C1 makes contact with the system 300 after the time-out period completes, C1 will no longer be bound to the user domain 444 and will essentially be a new user device without membership in any user domain. The content on C1 will therefore be no longer accessible, and Jane may enter new transactions to acquire new content.

In another implementation, an entire user account may be moved similarly to a different user domain. Referring to FIG. 8, user account 434 is shown as being bound to consumer Bob and S3. Transferring the account 434 is accomplished by dissociating it (i.e., the oval containing "Bob3") from the user domain 444 and re-associating it with another user domain, such as the user domain 948 shown in FIG. 9A and FIG. 9B.

In one implementation, upon removal of the user account 434 from the user domain 444, license L1, derived from rights R1 stored in user account 434, will also become unavailable to the user device to which it is bound. For example, referring to FIG. 4, L1 would no longer be available to C1. Thus, the content associated with rights R1 would no longer be accessible on C1.

In another implementation, the policy requiring a user account to be bound only to a single user domain is relaxed, allowing a user account to be bound to multiple user domains.

Implementations described above can be generalized as following method and system that allow for content distribution for one or more user devices.

The method includes: associating the user devices with a user domain; acquiring content with one or more user accounts linked to the user domain; accessing the acquired content with the user devices according to predetermined privileges. Access for an individual user device is valid while the device is associated with the user domain and has an active status.

The system includes: an open market coordinator to manage a user domain; and a plurality of domain service providers in communication with the open market coordinator. The user devices are members of the user domain and have access to content associated with the user domain. An individual user device has access according to predetermined privileges, wherein the access is valid while the individual user device is a member of the user domain and has an active status with the user domain. The domain service providers are configured to enforce the predetermined privileges applied to the user devices. The open market coordinator is configured to support the enforcement of the predetermined privileges among the domain service providers.

Figure 10A:
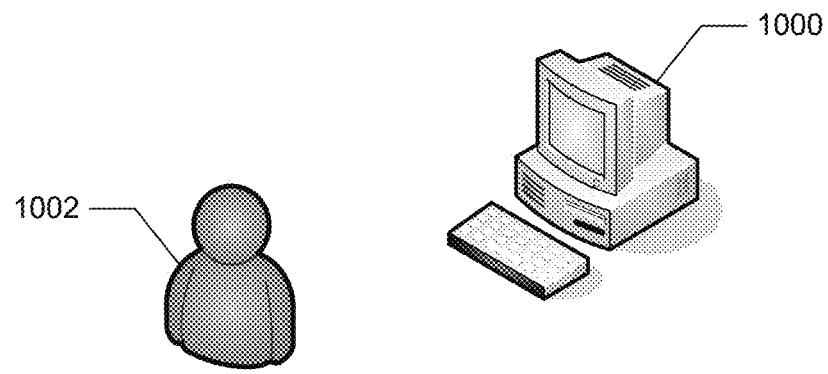
FIG. 10A and FIG. 10B illustrate a computer system implementing an open market content distribution system.

FIG. 10A illustrates a representation of a computer system 1000 and a user 1002. The user 1002 can use the computer system 1000 to implement content distribution. The computer system 1000 stores and executes a content distribution system 1016, implementing an open market model.

Figure 10B:
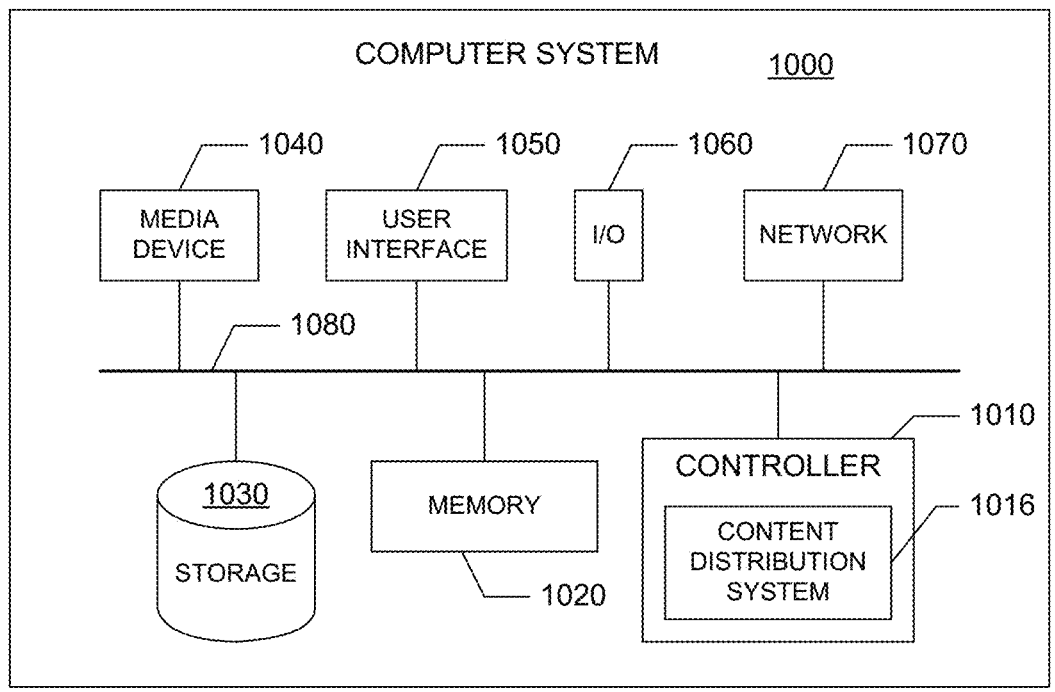

FIG. 10B is a functional block diagram illustrating the computer system 1000 hosting the content distribution system 1016 in accordance with one implementation of the present invention. The controller 1010 is a programmable processor and controls the operation of the computer system 1000 and its components. The controller 1010 loads instructions from the memory 1020 or an embedded controller memory (not shown) and executes these instructions to control the system. In its execution, the controller 1010 provides the content distribution system 1016 as a software system. Alternatively, this service can be implemented as separate components in the controller 1010 or the computer system 1000.

Memory 1020 stores data temporarily for use by the other components of the computer system 1000. In one implementation, memory 1020 is implemented as RAM. In one implementation, memory 1020 also includes long-term or permanent memory, such as flash memory and/or ROM.

Storage 1030 stores data temporarily or long term for use by other components of the computer system 1000, such as for storing data used by the content distribution system 1016. In one implementation, storage 1030 is a hard disk drive.

The media device 1040 receives removable media and reads and/or writes data to the inserted media. In one implementation, the media device 1040 is an optical disc drive.

The user interface 1050 includes components for accepting user input from the user of the computer system 100 and presenting information to the user. In one implementation, the user interface 1050 includes a keyboard, a mouse, audio speakers, and a display. The controller 1010 uses input from the user to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 170 includes a wired and/or wireless network connection, such as an RJ-45 or "Wi-Fi" interface (including, but not limited to 802.11) supporting an Ethernet connection.

A system communication path 1080 (e.g., a system communication bus) provides for transfers of data and control information between the media device 1040, user interface 1050, I/O interface 1060, network interface 1070, storage 1030, memory 1020, and controller 1010.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

The various implementations of the invention are realized in electronic hardware, computer software, or combinations of these technologies. Some implementations include one or more computer programs executed by a programmable processor or computer. For example, referring to FIG. 3, the open market coordinator and domain service providers may each include one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description articulates a policy in which user devices may belong to only one user domain at a time, in other implementations, user devices may belong to multiple user domains. In another example, the policy allowing a user account to be bound only to a single user domain is relaxed, allowing a user account to be bound to multiple user domains.

Accordingly, the present invention is not limited to only those implementations described above.

The invention claimed is:

1. A method of distributing content using one or more user devices in an open market system, comprising:
associating the one or more user devices with a user domain in communication with a content distribution system including content sources;
determining and authorizing access rights for the one or more user devices operating within the user domain, wherein determining and authorizing access rights includes acquiring a license for the acquired content to enforce a digital rights management scheme on the user domain, and having an active status with the user domain;
linking one or more user accounts through which the content is associated with the user domain prior to the content being acquired,
wherein the content acquired from at least one of the content sources through a first user account of the one or more user accounts is bound to the first user account and cannot be transferred to a different user account of the one or more user accounts;
acquiring the content with the one or more user accounts linked to the user domain;
accessing the acquired content with the one or more user devices according to predetermined privileges,
wherein access for an individual user device of the one or more user devices is only valid while the individual user device is associated with the user domain and has the active status with the user domain; and
changing the active status of the individual user device to an inactive status following a predetermined period of no contact with the user domain and disassociating each user device from the user domain.

2. The method of claim 1, wherein the predetermined privileges include limitations as to at least one of playing and copying of the acquired content.

3. The method of claim 1, further comprising
changing the inactive status of the individual user device to the active status once each user device re-establishes contact with the user domain.

4. The method of claim 1, wherein each user device links to only one user domain at a time.

5. The method of claim 1, wherein the one or more user accounts are maintained by a plurality of domain service providers.

6. The method of claim 5, wherein each of the plurality of domain service providers is in communication with at least one content source.

7. The method of claim 6, wherein the at least one content source includes at least one of online store and offline store.

* * * * *